3,700,559
METHOD OF PRODUCING TRYPTOPHAN BY FERMENTATION
Isamu Shiio and Hiroko Sato, Kanagawa-ken, Japan, assignors to Ajinomoto Co., Inc., Tokyo, Japan
No Drawing. Filed Aug. 21, 1970, Ser. No. 66,109
Claims priority, application Japan, Aug. 28, 1969, 44/68,178
Int. Cl. C12d 13/06
U.S. Cl. 195—29      8 Claims

ABSTRACT OF THE DISCLOSURE

Certain mutants of Brevibacterium, Corynebacterium, Microbacterium and Micrococcus which are resistant to 5-methyl-DL-tryptophan produce L-tryptophan in a culture medium.

---

The present invention relates to a method of producing L-tryptophan by fermentation.

It is well known that L-tryptophan is produced from such precursors of tryptophan as anthranilic acid, 3-indolepyruvic acid or indole by the actions of various microorganisms (Pat. Nos. 3,036,958, 3,296,090, 3,385,762 and 3,293,141). However, these known processes are not satisfactory for commercial production because the starting materials, anthranilic acid, indole and 3-indolepyruvic acid are very expensive.

It has now been found that some bacteria belonging to the genera Brevibacterium, Cocrynebacterium, Microbacterium and Micrococcus, and resistant to 5-methyl-DL-tryptophan produce a large amount of tryptophan when cultured on a nutrient medium which does not include any precursors of tryptophan. Although a strain of Escherichia coli which is resistant to 5-methyl-DL-tryptophan is known to produce L-tryptophan when cultured in the absence of any precursor of tryptophan, the amount of L-tryptophan produced is very small so it can be detected only by paper chromatography.

According to the present invention, there is provided a method of producing L-tryptophan, which comprises culturing a microorganism belonging to genera Corynebacterium, Brevibacterium, Microbacterium or Micrococcus, resistant to 5-methyl-DL-tryptophan, and able to produce tryptophan, on a nutrient medium containing an assimilable carbon source, an assimilable nitrogen source, and inorganic and organic nutrients, under aerobic conditions, and recovering the L-tryptophan thus produced.

Microorganisms which can be used in the present invention can be isolated from natural sources, or derived by conventional mutant inducing procedures from stock cultures. The L-tryptophan production of the above microorganisms is increased by phenylalanine and/or tyrosine requirements, or by resistance to compounds analogous to phenyl alanine or tyrosine. The microorganisms do not require histidine. These properties can be given to the microorganisms by using conventional mutant inducing procedures. Examples of microorganisms which are resistant to 5-methyl-DL-tryptophan and capable of producing tryptophan include Brevibacterium flavum AJ-3246 (ATCC 21427), AJ-3296 (FERM P-652, the FERM number refers to the accession number of the microorganism in the "Fermentation Research Institute, the Agency of Industrial Science and Technology, the Ministry of the Industrial Trade and Industry, Japan") and AJ-3247 which have been derived from Brevibacterium flavum ATCC 14067, and require phenylalanine and tyrosine for their growth, Corynebacterium acetoglutamicum AJ-3292 (FERM P-648) and AJ-3293 (FERM P-649) which have been derived from Corynebacterium acetoglutamicum ATCC 15806 and require phenylalanine and tyrosine for their growth, Microbacterium ammoniaphilum AJ-3294 (FERM P-650) which has been derived from Microbacterium ammoniaphilum ATCC 15354 and requires phenylalanine and tyrosine for its growth, and Micrococcus glutamicus AJ-3295 (FERM P-651) which has been derived from Micrococcus glutamicus ATCC 13032. The strains identified by accession numbers of public depositories are available from the depositories.

The following Table 1 shows growths of a bacterium which is resistant to 5-methyl-DL-tryptophan and a bacterium which is not resistant, when cultured on media containing varying amounts of 5-methyl-DL-tryptophan. Agar-nutrient media containing 5 g./l. glucose, 1.5 g./l. ammonium sulfate, 1 g./l. potassium dihydrogen phosphate, 3.0 g./l. dipotassium hydrogen phosphate, 1.5 g./l. urea, 0.1 g./l. magnesium sulfate, 0.001 g./l. calcium chloride, 1 g./l. casamino acid, 50 mg./l. L-tyrosine, 50 m./l. L-phenylalanine, 30 $\mu$g./l. biotin, 100 $\mu$g./l. vitamin $B_1$, 1 ml./l. aqueous minor elements solution,[1] 20 g./l. agar and 5-methyl-DL-tryptophan as indicated in Table 1, of pH 7.0 were placed in petri-dishes of 8.5 cm. diametre, each medium was inoculated with $5.0 \times 10^6$ cells of Brevibacterium flavum AJ-3246 (ATCC 21427) or $3.5 \times 10^6$ cells of Brevibacterium flavum ATCC 14067, and cultured at 30° C. for 96 hours. The colonies formed on the media were counted. In Table 1, the symbol "++" indicates the presence of more than 1,000 colonies on a plate, the symbol "+" indicates the presence of more than 100 colonies, and the symbol "—" indicates the absence of a colony.

TABLE 1

| Amount of 5-methyl-DL-tryptophan added ($\mu$g./ml.) | Number of colonies formed | |
|---|---|---|
| | Brev. flavum ATCC 21427 | Brev. flavum ATCC 14067 |
| 0 | ++ | ++ |
| 100 | ++ | ++ |
| 300 | ++ | ++ |
| 400 | ++ | + |
| 500 | ++ | 20 |
| 600 | ++ | — |
| 700 | + | — |
| 800 | + | — |
| 900 | 80 | — |
| 1,000 | 50 | — |

As is apparent from the Table 1, Brevibacterium flavum ATCC 21427 a strain resistant to 5-methyl-DL-tryptophan, can grow on media containing amounts of 5-methyl-DL-tryptophan, by which the growth of Brevibacterium flavum ATCC 14067 is completely inhibited.

According to the present invention, microorganisms, which form more than 1000 colonies when $3.5-5.0 \times 10^6$ cells of microorganism are inoculated on a medium containing 600 $\mu$g./ml. 5-methyl-DL-tryptophan, are defined as being resistant to 5-methyl-DL-tryptophan.

The culture medium used to produce L-tryptophan in the present invention may be entirely conventional. It includes an assimilable carbon source, an assimilable nitrogen source, and the usual minor nutrients. Examples of the carbon source are carbohydrates such as glucose, fructose, maltose, starch hydrolyzate, cellulose hydrolyzate or molasses, organic acids such as acetic acid or succinic acid, alcohols such as glycerol, and hydrocarbons such as n-paraffin. Useful nitrogen sources include ammonium sulfate, urea, ammonium nitrate, ammonium chloride or gaseous ammonia. Inorganic salts, such as phosphoric, magnesium, calcium, ferrous, manganese and other minor metallic salts are generally present. When nutrient requiring mutants are used, the nutrients required should

---

[1] 88 mg./l. $Na_2B_4O_7 \cdot 10H_2O$, 37 mg./l. $(NH_4)_6Mo_7O_{24} \cdot 4H_2O$, 970 mg./l. $FeCl_3 \cdot 6H_2O$, 8800 mg./l. $ZnSO_4 \cdot 7H_2O$, 270 mg./l. $CuSO_4 \cdot 5H_2O$ and 72 mg./l. $MnCl_2 \cdot 4H_2O$.

be present. Amino acids, vitamins, "Aji-Eki" (brand name of soybean hydrolyzate), yeast extracts, peptone and casamino acid are preferably present for good bacterial growth. The culture medium of the present invention does not include precursors which are specific to tryptophan biosynthesis, such as anthranilic acid, indole or 3-indolpyruvic acid.

The fermentation of the present invention is performed at a pH between 5 and 9, at a temperature of 20 to 40° C. under aerobic conditions for 24 to 72 hours. The pH of the culture medium can be adjusted by adding sterile calcium carbonate, aqueous or gaseous ammonia, mineral acid or organic acid during the fermentation.

The L-tryptophan produced in the cultured broth can be recovered by conventional methods.

Tryptophan produced by the present invention is identified as L-tryptophan by its $R_f$ values in paper chromatography, its Ehrlich's reaction and in its bioassay by using *Leuconostoc mesenteroides* ATCC 8042.

EXAMPLE 1

A culture medium containing 10 g./dl. glucose, 3 g./dl. ammonium sulfate, 0.1 g./dl. potassium dihydrogen phosphate, 0.04 g./dl. magnesium sulfate hepta hydrate, 2 p.p.m. ferrous and manganese ions, 200 μg./l. vitamin $B_1$, 300 μg./l. biotin, 5 g./dl. calcium carbonate, 20 ml./l. "Aji-Eki," 0.1 g./dl. casamino acid, 125 mg./l. L-tyrosine and 250 mg./l. L-phenylalanine, of pH 7.0 was prepared, 20 ml. batches of the medium were placed in 500 ml. shaking flasks, and inoculated with strains of bacteria as indicated in Table 2. Each medium was cultured at 30° C. for 72 hours with shaking, and the cultured broths were found to contain L-tryptophan as shown in the following Table 2.

TABLE 2

| Strains cultured: | Amount of L-tryptophan produced (mg./l.) |
|---|---|
| Coryn. acetoglutamicum ATCC–15806 | 0 |
| Coryn. acetoglutamicum AJ–3292 | 11.0 |
| Coryn. acetoglutamicum AJ–3293 | 186.0 |
| Microbact. ammoniaphilum ATCC–15354 | 0 |
| Microbact. ammoniaphilum AJ–3294 | 254 |
| Brev. flavum AJ–3296 | 456 |
| Micrococcus glutamicus ATCC–13032 | 0 |
| Micrococcus glutamicus AJ–3295 | 23.5 |

The cultured broths of *Brevibacterium flavum* AJ–3296 were collected, bacterial cells and solid calcium carbonate were removed by centrifuging and 10 litres of the resultant solution was passed through a column packed with a cation exchange resin of hydrogen ion type (Diaion SK 104). After washing, 0.5 N-ammonia water was introduced onto the column to elute L-tryptophan, and the eluate was evaporated to dryness under reduced pressure. The resulting crude, crystalline L-tryptophan was dissolved in a small amount of hot 50% ethanol, treated with active charcoal, and the ethanol solution was cooled. Pure crystalline L-tryptophan was obtained in an amount of 2.6 g.

EXAMPLE 2

A culture medium containing 10 g./dl. glucose, 4 g./dl. ammonium sulfate, 0.1 g./dl. potassium dihydrogen phosphate, 0.04 g./dl. magnesium sulfate hepta hydrate, 2 p.p.m. ferrous and manganese ions, 200 μg./l. vitamin $B_1$, 300 μg./l. biotin, 5 g./dl. calcium carbonate, 2 ml./l. "Aji-Eki," 0.1 g./dl. casamino acid, 150 mg./l. L-tyrosine and 250 mg./l. L-phenylalanine, of pH 7.0 was prepared, 3 ml. batches of the medium were placed in test tubes, and inoculated with a loopful of bacteria as indicated in Table 3. Each medium was cultured at 30° C. for 72 hours with shaking, and the cultured broths were found to contain L-tryptophan as shown in the following Table 3.

TABLE 3

| Strains | Resistance to 5-methyl-DL tryptophan | Amount of L-tryptophan produced (mg./l.) |
|---|---|---|
| Brevibacterium flavum ATCC–14067 | No | <0.1 |
| Brevibacterium flavum AJ–3246 (ATCC–21427) | Yes | 51.4 |
| Brevibacterium flavum AJ–3247 | Yes | 72.0 |

What we claim is:

1. A method of producing L-tryptophan by fermentation which comprises:
   (a) culturing a microorganism of the genera Corynebacterium, Brevibacterium, Microbacterium, or Micrococcus on a nutrient medium under aerobic conditions,
      (1) said microorganism being capable of producing extra-cellular L-tryptophan in said medium,
      (2) said medium being free of tryptophan precursors and containing sources of assimilable carbon and nitrogen and minor organic and inorganic nutrients necessary to the growth of said microorganism,
      (3) said microorganism being cultured on said nutrient medium until L-tryptophan accumulates in the same,
      (4) said microorganism being resistant to 5-methyl-DL-tryptophan in that the microorganism is capable of forming more than 1000 colonies when inoculated on said medium in the presence of 600 μg./ml. 5-methyl-DL-tryptophan in an amount of $3.5 \times 10^6$ to $5.0 \times 10^6$ cells; and
   (b) recovering the accumulated L-tryptophan.

2. A method as set forth in claim 1, wherein said assimilable carbon source is a carbohydrate.

3. A method as set forth in claim 1, said microorganism being a strain of *Brevibacterium flavum*, *Microbacterium ammoniaphilum* or *Micrococcus glutamicus*.

4. A method as set forth in claim 1 wherein said microorganism is *Brevibacterium flavum* ATCC 21247 or FERM–P652, or *Microbacterium ammoniaphilum* FERM–P–650 or *Micrococcus glutamicus* FERM–P–651.

5. A method as set forth in claim 1, wherein said microorganism is a strain of *Corynebacterium acetoglutamicum*.

6. A method as set forth in claim 5, wherein said strain is *Corynebacterium acetoglutamicum* FERM–P–648 or FERM–P–649.

7. A method as set forth in claim 1, wherein said microorganism is capable of substantial growth in said medium in the absence of histidine.

8. A method as set forth in claim 1, wherein said microorganism requires at least one member of the group consisting of phenylalanine and tyrosine for growth on said medium.

References Cited

UNITED STATES PATENTS 3,594,279   7/1971   Nakayama et al. _____ 195—28 R

LIONEL M. SHAPIRO, Primary Examiner

G. M. NATH, Assistant Examiner

U.S. Cl. X.R.

195—28 R, 30, 47